United States Patent [19]

Lenz

[11] 4,413,818

[45] Nov. 8, 1983

[54] COMBINATION VISE

[75] Inventor: John O. Lenz, Coon Rapids, Minn.

[73] Assignee: Kurt Manufacturing Company, Inc., Minneapolis, Minn.

[21] Appl. No.: 295,732

[22] Filed: Aug. 24, 1981

[51] Int. Cl.[3] ............................................. B23Q 1/04

[52] U.S. Cl. ..................................... 269/81; 269/93; 269/99; 269/244; 269/251; 269/88

[58] Field of Search ........................ 269/81, 82, 91, 93, 269/99-101, 240, 244, 246-248, 250-253, 88; 409/900, 903

[56] References Cited

U.S. PATENT DOCUMENTS

| | | | |
|---|---|---|---|
| 713,189 | 11/1902 | Yates | 269/250 |
| 1,329,728 | 2/1920 | Sovereign | 269/100 |
| 2,428,111 | 9/1947 | Eldrup | 269/93 |
| 2,471,361 | 5/1949 | Trefz . | |
| 2,526,020 | 10/1950 | Fuhr | 269/248 |
| 2,633,764 | 4/1953 | Ruser . | |
| 2,978,966 | 4/1961 | Swenson . | |
| 3,051,473 | 8/1962 | Juhase . | |
| 3,357,697 | 12/1967 | Zanitsch | 269/246 |
| 3,865,360 | 2/1975 | Schweidler . | |

FOREIGN PATENT DOCUMENTS

| | | | |
|---|---|---|---|
| 912079 | 5/1954 | Fed. Rep. of Germany | 269/240 |
| 932230 | 7/1963 | United Kingdom | 269/240 |

OTHER PUBLICATIONS

Kurt Manufacturing Co. *Precision Machine Vise Catalog* -pp. 10 and 11.

*Primary Examiner*—Robert C. Watson
*Attorney, Agent, or Firm*—Kinney, Lange, Braddock, Westmanand Fairbairn

[57] ABSTRACT

A combination vise that comprises a box construction frame that has three side surfaces for supporting the vise so that the jaws can be placed perpendicular to the table surface by laying the vise on either side and clamping it in position, or the jaws can be positioned on the top of the vise in a normal manner when the vise is set on its bottom.

The three side surfaces of the vise which do not carry the jaws are machined so they will lay flat on a machine tool table and properly orient the jaws when the vise is clamped on any one of the three usable sides.

3 Claims, 5 Drawing Figures

COMBINATION VISE

BACKGROUND OF THE INVENTION

1. Field of the Invention

The present invention relates to machine vises which can be mounted in a plurality of positions.

2. Description of the Prior Art

Machine vises have been formed as universal type vises. A universal vise is shown in U.S. Pat. No. 2,471,361 issued to O. F. Trefz on May 24, 1949. This vise is one which can be disassembled and then reassembled in a different configuration for different uses. However, it does not show the idea of mounting the vise so the jaws are perpendicular to the worktable by supporting the vise on either one of its sides for use.

A work holding vise which is capable of being supported along the edge of a worktable for a drill press with the jaws vertical is shown in U.S. Pat. No. 2,633,764. The vise itself is supported on the side edge of the worktable rather than laying the vise on its side and clamping it in position. The vise is capable of being rotated between its first and second mounting members on pivot bolts 46.

A hand vise used in machining operation is shown in U.S. Pat. No. 3,051,473, and also milling machine vises are shown in U.S. Pat. Nos. 2,978,966 and 3,865,360. While vises called NC Vises may have machined side surfaces, provision of means for clamping such vises in selected positions on either one of its sides or on its normal base is not made. Further, the side surfaces of the NC vises are not sufficiently stable or of large enough size to provide stability necessary for clamping a vise tightly onto the table. Such NC vises are made by Kurt Manufacturing Company, Inc., the assignee of the present application and are shown in their Precision Machine Vise Catalog on Pages 11 and 12.

SUMMARY OF THE INVENTION

The present invention relates to a vise body which is made so that it will support a fixed jaw and a movable jaw in a normal manner and has a base and two sides perpendicular to the plane of the base. The sides are of sufficient size and rigidity to permit the vise to be clamped on its side surfaces so that the jaws are perpendicular to the worktable and can clamp objects on the lateral sides of the vise.

The vise body is generally hollow so that when laid on its side clamps can be placed to clamp the sidewalls firmly down onto the table. The sidewalls are also provided with receptacles for receiving the end portions of clamps that will hold the vise in place on its normal base with the jaws oriented on the top of the vise in the normal manner.

DETAILED DESCRIPTION OF THE PREFERRED EMBODIMENT

Figure 1:
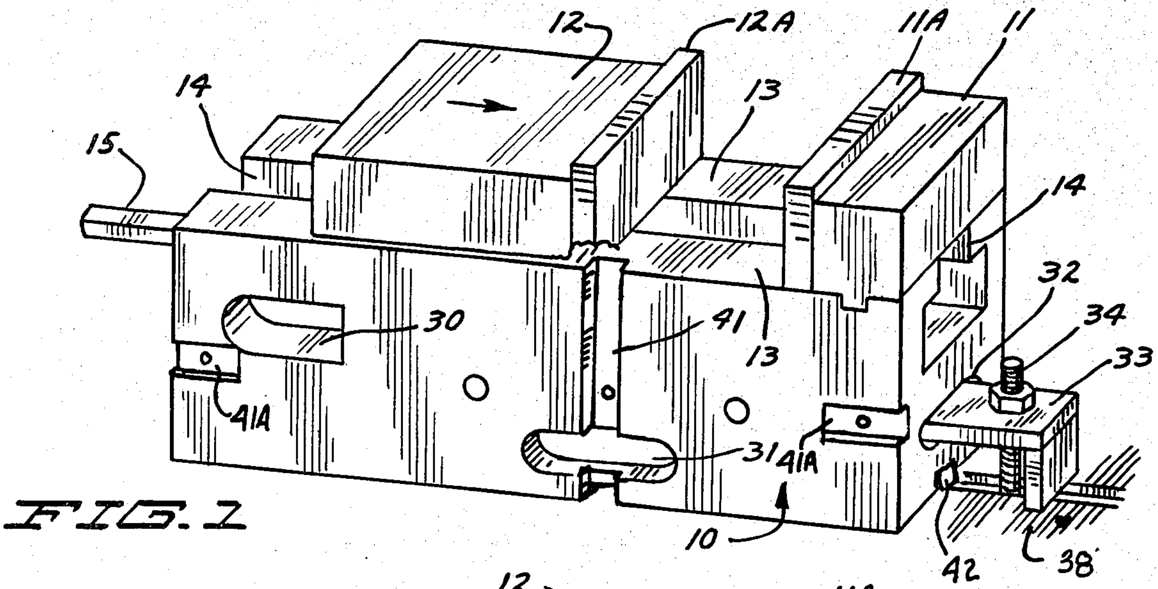
FIG. 1 is a perspective view of a vise having a body made according to the present invention.
Figure 2:
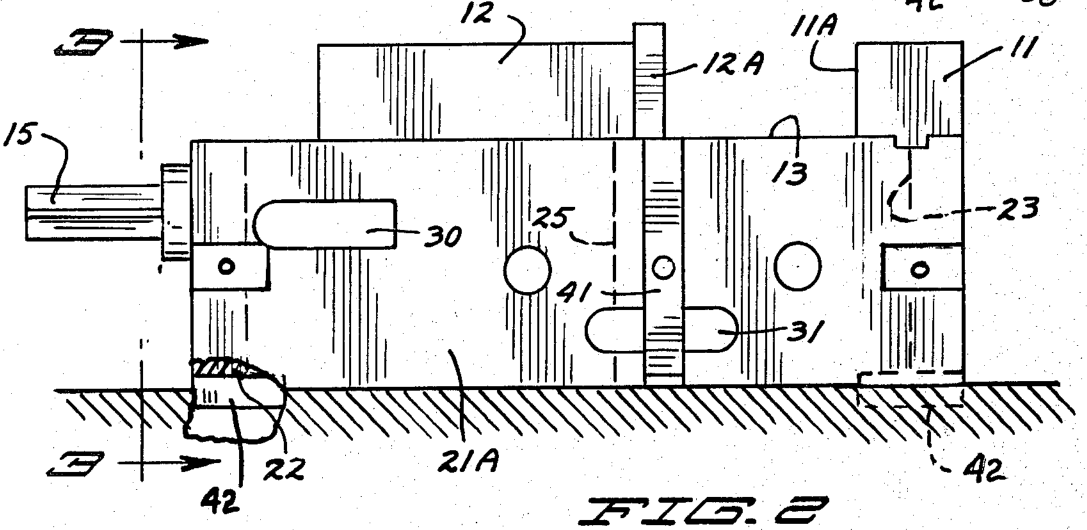
FIG. 2 is a side elevational view of the device of FIG. 1.

A vise body indicated at 10 is made up of a box type housing that has a fixed jaw 11 adjacent one end thereof, and a movable jaw 12 slidably mounted on guide surfaces 13 which are on the upper side of the vise body. A central opening 14 is formed between the guide surfaces 13 for permitting a nut portion of the movable jaw 12 to be attached to a vise screw 15. The screw 15 is suitably mounted on the body so that upon rotation of the screw the movable jaw will move toward and away from the fixed jaw. The jaw 11, which is the fixed jaw, has a jaw plate 11A defining a clamping plane perpendicular to the plane of the guideways 13, and the jaw 12 has a jaw plate 12A which has a clamping plane meeting and parallel to the face of the jaw plate 11A. The longitudinal axis of the jaw plates extends across the width of the vise. This axis is perpendicular to the axis of the screw and in normal use the longitudinal axis is parallel to the support plane of the vise and thus parallel to the tool table on which the vise is used.

The vise body 10 is made up either by casting or by fabricating, and includes a pair of side walls 20 and 21, respectively, which have side surfaces 20A and 21A. The housing further includes end walls 22 and 23, respectively and as stated, the overhanging shoulders forming the guide surfaces 13 are used for guiding the movable jaw 12.

The side walls 20 and 21 may be braced relative to the upright walls with a suitable cross brace as desired. One such cross member or cross brace is shown in dotted lines at 25.

Figure 5:
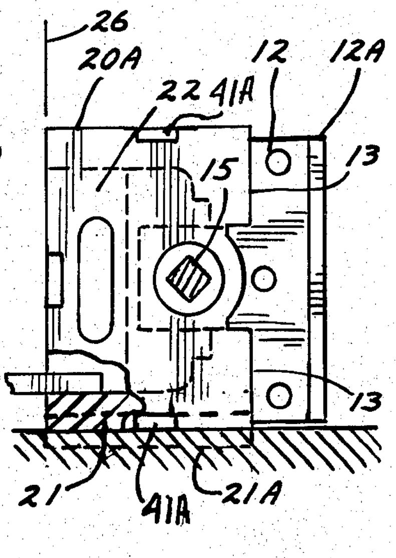
FIG. 5 is a view taken on the same line as FIG. 3 with the vise oriented on an opposite, second side surface from that shown in FIG. 4.

The bottom edges of the walls 20, 21, 22 and 23 define a normal base support plane 26 also shown by the line in FIG. 5. The normal base support plane is parallel to the plane of the guideways 13, and parallel to the normal top side of the vise frame and parallel to the longitudinal axis of the jaw plates. The surfaces 20A and 21A are machined to be perpendicular to the plane 26 and form first and second side surfaces as previously explained.

Figure 4:
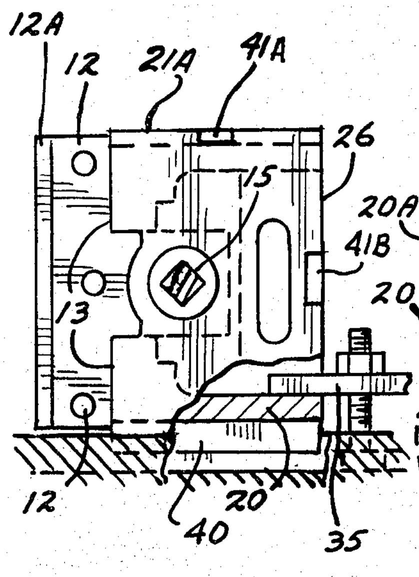
FIG. 4 is a view taken as on the same line as FIG. 3 with the vise oriented on a first side surface.
Figure 3:
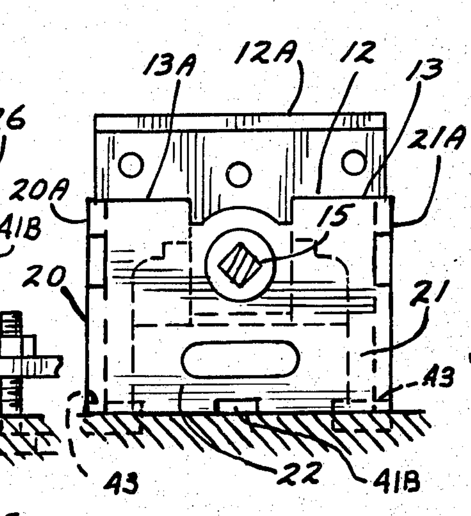
FIG. 3 is an end view of the device of FIG. 2 taken as on line 3—3 in FIG. 2.

For clamping, the sidewalls 21A and 22A are provided with recesses or openings 30 and 31, and the end walls can have recesses such as that shown at 32 for receiving clamps 33 which are held in place with T bolts fastened in a table slot in a table 38 in a normal manner. Other types of clamps can be used. The ends of clamps are inserted into the recess 30, 31 or 32 for holding the vise securely when the vise base plane 26 is supported on a table top. This normal orientation for use is shown in FIG. 3. Additionally, the vise can be laid upon its first side 20 as shown in FIG. 4, with the jaws along the side of the vise that extends generally perpendicular to the table top on which it is being clamped. In other words the plane of the support guideways 13 and the longitudinal axis of the jaws are generally perpendicular to the table top on a first side of the vise.

Clamps such as that shown at 33 can be utilized on the sidewall 20 because the interior of the vise is hollow, and permits this clamping along the edge of the sidewall to securely hold the vise in position. Of course more than one clamp can be utilized for securing the vise in this position. The workpiece then will be clamped along a line generally vertically with respect to the table top.

Likewise, the vise can also be placed on its opposite side 21 as shown in FIG. 5 and clamped in place with suitable clamps acting on the inner surface of the sidewall 21 to clamp the vise tightly. The longitudinal axes of the jaws are perpendicular to the table top surface and a work part can be clamped extending perpendicular from the table.

Thus the vise body has three usable, stable support plates oriented so the jaws are oriented in a normal manner on the top side of the vise, and selectively rotated 90° in either direction so that the side surfaces of the vise are clamped against the table top to hold the jaws in position. The jaws are made so that they can be operated with the vise in this position. The ends of the jaws must be between the planes defined by the side surfaces so the jaws do not contact the table when the vise is placed on its sides.

A guide key shown at 40 can be provided in a cross keyway 41 on either side of the vise body along the side surfaces of the vise and this key may be inserted into a table slot for aiding in holding the vise very securely when it is laid on its side. In addition short keyways 41A which extend in longitudinal direction can be provided. The "bottom" wall may have keyways 41B at the lower edge of both end walls which hold keys 42. Also, the bottom edges of the side walls have keyways to hold keys shown in dotted lines at 43. The keyways can be used for holding keys to securely hold the vise on the table.

The vise thus has three support planes for clamping. The planes each provide for stable support because the support extends out to the perimeter of the vise body, not only at the lower edges of the body, but also along the sides of the body.

The vise may be cast from suitable material and then machined to properly orient the three supporting planes.

What is claimed is:

1. A vise body having a pair of sidewalls, a pair of end walls joining said sidewalls, and a bottom wall joining the end and sidewalls, the exterior surface of the bottom wall forming a first plane support of the vise body on a table, guide means on said vise body on an upper side thereof opposite the bottom walls, a fixed jaw mounted on the upper wall adjacent said guideway, a movable jaw mounted on said guideway for movement toward and away from said fixed jaw, said fixed and movable jaws having longitudinal jaw axes extending transverse to the direction of movement of the movable jaw and generally parallel to the first plane, the side and bottom walls having generally flat exterior surfaces, the sidewalls defining plane at right angles to the bottom wall and parallel to each other, the fixed and movable jaws being of size to be entirely between the planes of the sidewalls, each of said sidewalls, end walls and bottom walls having groove means defined therein opening to the respective walls, and the groove means defining surfaces at right angles to the plane of the respective wall in which the respective groove means is formed to permit selectively placing the sidewalls and bottom wall onto a support table using the groove means surfaces for clamping, to thereby permit the vise body to be placed on a support table supported on either of said sidewalls with the longitudinal axes of said jaws extending perpendicular to such table, or supported on the bottom wall with the longitudinal axes of said jaws extending parallel to the table.

2. The combination as specified in claim 1 wherein said side surfaces are machined surfaces that are formed parallel to each other and perpendicular to the first plane.

3. The apparatus of claim 1 and a vise screw for moving the movable jaw, said screw having a rotational axis parallel to the direction of movement of the movable jaw toward and away from the fixed jaw.

* * * * *